United States Patent

Maemura et al.

[11] Patent Number: 6,076,119
[45] Date of Patent: Jun. 13, 2000

[54] OPERATION MODE TRANSFER SYSTEM AND METHOD

[75] Inventors: Hiroyuki Maemura; Nobuya Uda, both of Tokyo, Japan

[73] Assignees: Mitsubishi Electric System LSI Design Corporation, Itami; Mitsubishi Denki Kabushiki Kaisha, Tokyo, both of Japan

[21] Appl. No.: 09/047,484

[22] Filed: Mar. 25, 1998

[30] Foreign Application Priority Data

Sep. 29, 1997 [JP] Japan .................................. 9-264165

[51] Int. Cl.[7] .............................................. H03K 19/0185
[52] U.S. Cl. .................................... 710/15; 327/112
[58] Field of Search .................................... 327/100–112; 710/15–19, 33, 40–48, 63–65, 72–74; 713/300–320

[56] References Cited

U.S. PATENT DOCUMENTS

| | | | |
|---|---|---|---|
| 5,140,193 | 8/1992 | Freeman et al. | 307/465 |
| 5,675,813 | 10/1997 | Holmdahl | 713/310 |
| 5,767,844 | 6/1998 | Stoye | 345/212 |
| 5,808,481 | 9/1998 | Thompson | 326/83 |
| 5,835,791 | 11/1998 | Goff et al. | 710/62 |
| 5,841,424 | 11/1998 | Kikinis | 345/168 |
| 5,884,086 | 3/1999 | Amoni et al. | 713/300 |
| 5,896,534 | 4/1999 | Pearce et al. | 709/300 |
| 5,905,389 | 5/1999 | Alleven | 327/108 |
| 5,912,569 | 6/1999 | Alleven | 327/108 |
| 5,929,664 | 7/1999 | Alleven | 327/108 |
| 5,935,224 | 8/1999 | Svancarek et al. | 710/63 |
| 5,943,506 | 8/1999 | Poisner | 710/48 |

FOREIGN PATENT DOCUMENTS

3-201175  9/1991  Japan .
6-327055  11/1994  Japan .

*Primary Examiner*—Christopher B. Shin
*Attorney, Agent, or Firm*—Burns, Doane, Swecker & Mathis, LLP

[57] ABSTRACT

An operation mode transfer system capable of solving a problem of a conventional system in that a processing load of a host computer cannot be reduced as long as a device is physically connected with the host computer because the host computer must carry out, even when the device is inoperative, the same communication processing as that performed when the device is operative. The present system connects a pullup resistor to a pullup power supply to set the device operative, and disconnects it from the pullup power supply to set the device inoperative, in response to the instructions from a CPU of the device.

5 Claims, 9 Drawing Sheets

| REGISTER 19 | REGISTER 28 | GATE 22 | GATE 29 | MODE OF DEVICE 11 |
|---|---|---|---|---|
| L | L | CONDUCTIVE STATE | IMPEDANCE STATE | OPERATIVE |
| L | H | CONDUCTIVE STATE | NONCONDUCTIVE STATE | OPERATIVE |
| H | L | NONCONDUCTIVE STATE | IMPEDANCE STATE | STANDBY |
| H | H | NONCONDUCTIVE STATE | NONCONDUCTIVE STATE | INOPERATIVE |

| REGISTER 15 (REGISTER 17) | REGISTER 30 (REGISTER 31) | STATE OF BUFFER 16 (STATE OF BUFFER 18) |
|---|---|---|
| L | L | OFF (HIGH-IMPEDANCE STATE) |
| H | L | OFF (HIGH-IMPEDANCE STATE) |
| L | H | L OUTPUT |
| H | H | H OUTPUT |

OPERATION MODE TRANSFER SYSTEM AND METHOD

BACKGROUND OF THE INVENTION

1. Field of the Invention

The present invention relates to an operation mode transfer system and an operation mode transfer method that transfer an operative or inoperative mode of a device connected to a host computer according to the USB (Universal Serial Bus Specification Revision 1.0, Jan. 15, 1996) standard.

2. Description of Related Art

Figure 9:
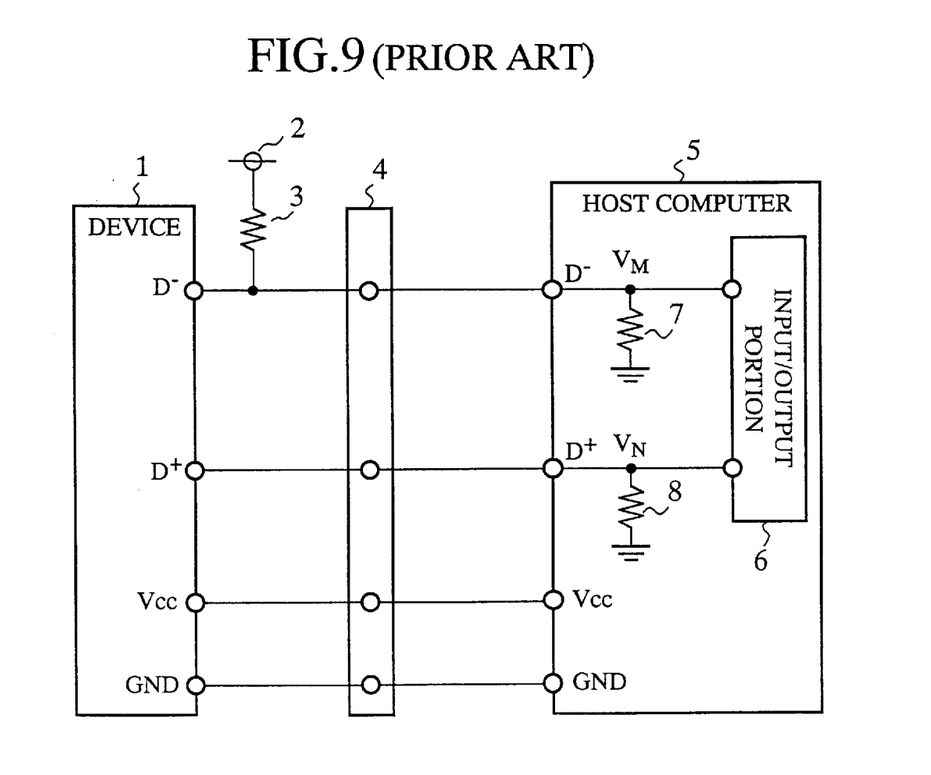
FIG. 9 is a circuit diagram showing an interconnection between a host computer and a device according to the USB standard.

FIG. 9 is a circuit diagram showing a relationship between a host computer and a device according to the USB standard. In FIG. 9, the reference numeral 1 designates a device like a mouse, a keyboard, a data tablet, or a game pad; 2 designates a pullup power supply; 3 designates a USB standard pullup resistor for pulling up a signal line D⁻ according to the same standard; 4 designates a connector for connecting the device 1 with a host computer 5 such as a personal computer; 6 designates an input/output portion of the host computer 5 for receiving and transmitting data from and to the device 1 through the signal lines D⁻ and D⁺; 7 designates a USB standard pulldown resistor for pulling down the signal line D⁻; and 8 designates a USB standard pulldown resistor for pulling down the signal line D⁺.

Next, the operation of the conventional system will be described.

First, according to the USB standard communication scheme, the host computer 5 and device 1 are interconnected through four lines (the signal lines D⁻ and D⁺, 5V power supply $V_{cc}$, and ground wire GND) as shown in FIG. 9.

With this arrangement, the device 1 transmits data to the host computer 5 by applying a differential signal between the signal lines D⁻ and D⁺. Specifically, the device 1 applies an L level signal to the signal line D⁻ when applying an H level signal to the signal line D⁺, and vice versa. Thus, the input/output portion 6 of the host computer 5 receives the data from the device 1, and a CPU of the host computer 5 not shown in FIG. 9 analyzes the contents of the data.

However, the system with such a configuration has no operation mode transfer system that notifies the host computer 5 about the operative or inoperative mode of the device 1 while the device 1 is connected to the host computer 5. Accordingly, the host computer 5 considers that the device 1 is in the operative mode as long as they are physically interconnected, and hence the CPU of the host computer 5 must periodically check the receiving state of the input/output portion 6.

Figure 10A:
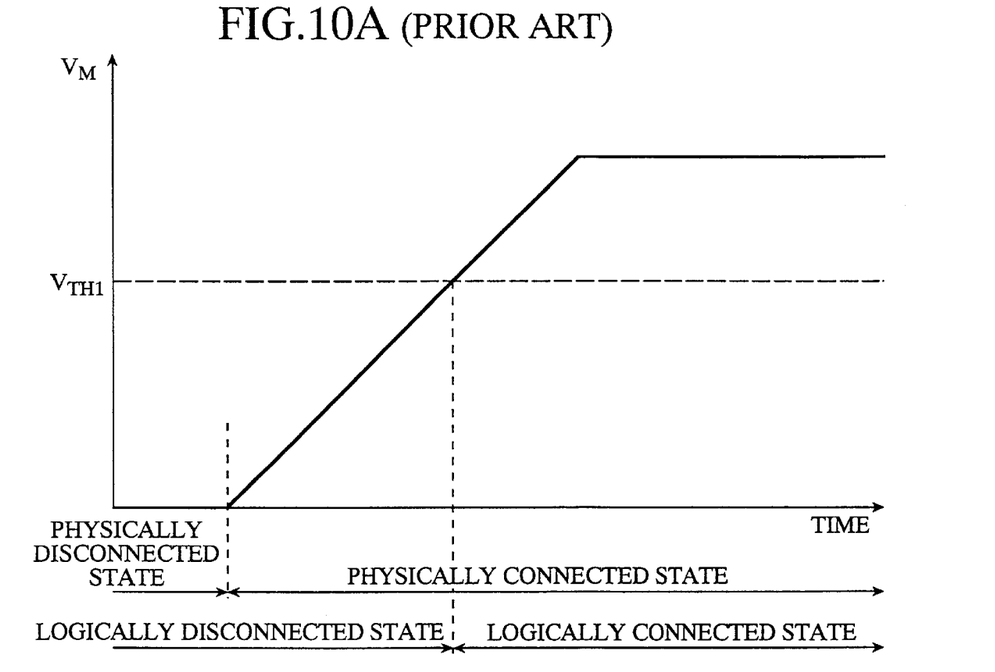
FIGS. 10A and 10B are diagrams illustrating variations of the potential $V_M$ on a signal line $D^-$ in the conventional system of FIG. 9.
Figure 10B:
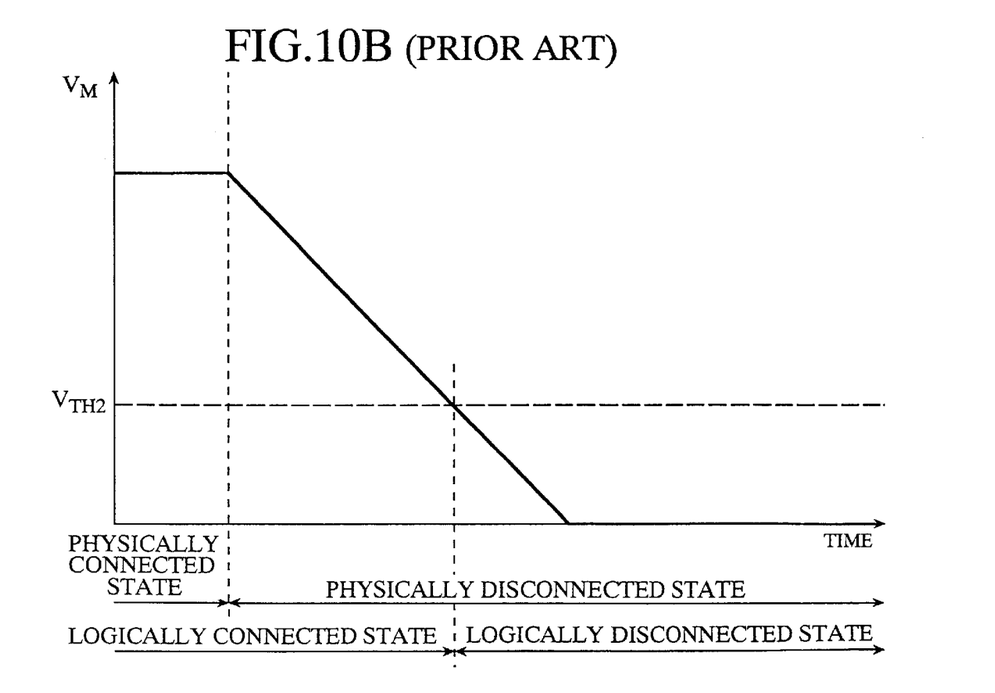

Incidentally, while the device 1 is logically connected with the host computer 5, the potential $V_M$ of the signal line D⁻ is kept higher than a set value $V_{TH1}$ as shown in FIG. 10A because it is pulled up by the pullup power supply 2 through the pullup resistor 3 as shown in FIG. 9. On the contrary, while the device 1 is logically disconnected from the host computer 5, the potential $V_M$ of the signal line D⁻ is kept lower than a set value $V_{TH2}$ as shown in FIG. 10B because it is not pulled up.

Thus, the host computer 5 can make a decision whether the device 1 is logically connected or not by comparing the potential $V_M$ of the signal line D⁻ with the set values $V_{TH1}$ and $V_{TH2}$.

With the foregoing configuration, although the host computer 5 can decide whether the device 1 is physically connected or not, it cannot make a decision whether the device 1 is operative or not because the conventional system has no operation mode transfer system. Accordingly, even if the device 1 is inoperative in actuality, the host computer 5 must continue a communication processing like that carried out while the device 1 is operative as long as the device 1 is physically connected. This presents a problem in that the processing load of the host computer 5 cannot be reduced even if the device 1 is inoperative mode.

In addition, even if the device 1 is not actually operative, a current flows from the pullup power supply 2 to the ground through the pullup resistor 3 and pulldown resistor 7 as long as the device 1 is physically connected with the host computer 5. This arises another problem in that a current consumption cannot be reduced.

SUMMARY OF THE INVENTION

The present invention is implemented to solve the foregoing problems. It is therefore an object of the present invention to provide an operation mode transfer system and an operation mode transfer method capable of conveying to the host computer information on whether the device is operative or inoperative.

According to a first aspect of the present invention, there is provided and operation mode transfer system comprising: setting means for setting an operative mode and an inoperative mode of a device; a pullup resistor according to a USB (Universal Serial Bus) standard with its first end connected to a signal line according to the USB standard; and a first switching circuit with its first end connected to a power supply, and its second end connected to a second end of the pullup resistor, wherein the first switching circuit is brought into conduction when the setting means sets the operative mode of the device, and is brought out of conduction when the setting means sets the inoperative mode of the device.

Here, the operation mode transfer system may further comprise a second switching circuit with its first end connected to the second end of the pullup resistor, and its second end connected to a ground, wherein the second switching circuit may be brought out of conduction when the setting means sets the operative mode of the device, and brought into conduction when the setting means sets the inoperative mode of the device.

The operation mode transfer system may further comprise a tri-state buffer connected to the signal line, and a register connected to the tri-state buffer, wherein the setting means may set the tri-state buffer in a high-impedance state through the register when it sets the inoperative mode of the device.

According to a second aspect of the present invention, there is provided an operation mode transfer system comprising: setting means for setting an operative mode, an inoperative mode and a standby mode of a device; a pullup resistor according to a USB (Universal Serial Bus) standard with its first end connected to a signal line according to the USB standard; and a switching circuit with its first end connected to a power supply, and its second end connected to a second end of the pullup resistor, wherein the switching circuit is brought into conduction when the setting means sets the operative mode of the device, is brought out of conduction when the setting means sets the inoperative mode of the device, and is brought into an impedance state when the setting means sets the standby mode of the device.

According to a third aspect of the present invention, there is provided an operation mode transfer method comprising the steps of: supplying a first signal line and a second signal line with signals of different levels, when setting a device in an operative mode, the first signal line and the second signal line according to USB (Universal Serial Bus) standard; and supplying the first signal line and the second signal line with a signal of a same level when setting the device in an inoperative mode.

DETAILED DESCRIPTION OF THE PREFERRED EMBODIMENTS

The invention will now be described with reference to the accompanying drawings.

Embodiment 1

Figure 1:
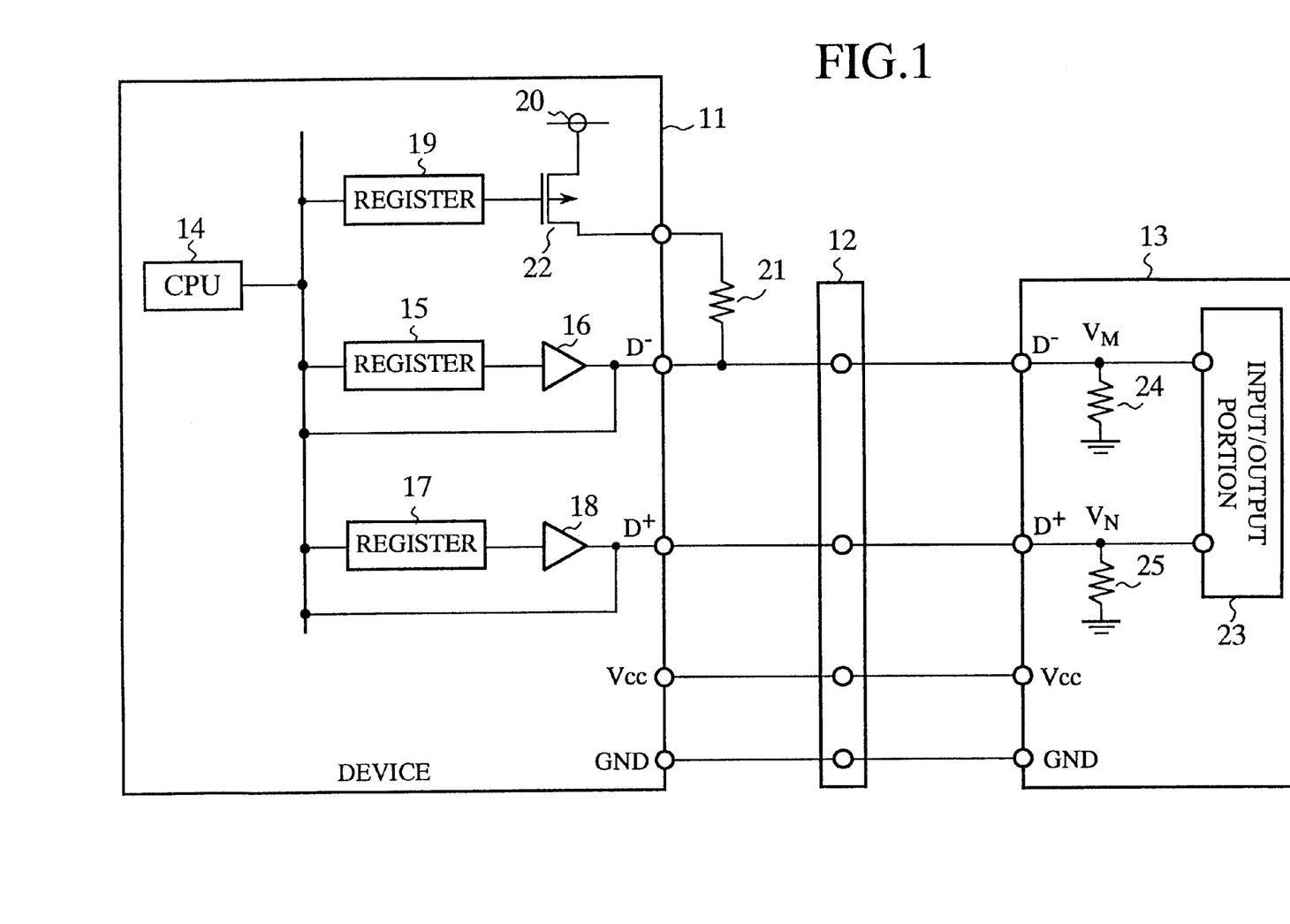
FIG. 1 is a circuit diagram showing an embodiment 1 of an operation mode transfer system in accordance with the present invention.

FIG. 1 is a circuit diagram showing an embodiment 1 of an operation mode transfer system in accordance with the present invention. In FIG. 1, the reference numeral 11 designate a device like a mouse, a keyboard, a data tablet, or a game pad; 12 designate a connector for interconnecting the device 11 and a host computer 13 consisting of a personal computer or the like.

The reference numeral 14 designates a CPU (setting means) for setting, in the operative mode of the device 11, an L level signal or an H level signal to registers 15 and 17 in accordance with data to be transmitted to the host computer 13, and the L level signal to a register 19, and for setting, in the inoperative mode of the device 11, the H level signal to the register 19. The reference numeral 15 designates the register for storing the signal fed from the CPU 14; 16 designate a buffer for supplying the USB standard signal line $D^-$ with the signal stored in the register 15; 17 designates the register for storing the signal fed from the CPU 14; and 18 designate a buffer for supplying the USB standard signal line $D^+$ with the signal stored in the register 17.

The reference numeral 19 designates the register (setting means) for storing the L level signal fed from the CPU 14 when the device 11 is operative, and the H level signal fed from the CPU 14 when the device 11 is inoperative. The reference numeral 20 designates a pullup power supply (power supply); 21 designates a USB standard pullup resistor with its first end connected to a signal line $D^-$ to pull it up; and 22 designates a gate (first switching circuit) consisting of a P-channel MOS transistor or the like. The gate 22 has its first end connected to the pullup power supply 20 and its second end connected to a second end of the pullup resistor 21, and is brought into a conducting state when the L level signal is stored in the register 19, and into a nonconducting state when the H level signal is stored therein.

The reference numeral 23 designates an input/output portion of the host computer 13 for receiving and transmitting data from and to the device 11 through the signal lines $D^-$ and $D^+$; 24 designates a USB standard pulldown resistor for pulling down the signal line $D^-$; and 25 designates a USB standard pulldown resistor for pulling down the signal line $D^+$.

Next, the operation of the present embodiment 1 will be described.

First, in the communication scheme according to the USB standard, the host computer 13 and device 11 are interconnected through four lines (the signal lines $D^-$ and $D^+$, 5V power supply $V_{cc}$, and ground wire GND).

With this arrangement, the device 11 transmits data to the host computer 13 by applying a differential signal between the signal lines $D^-$ and $D^+$. Specifically, the device 11 applies the L level signal to the signal line $D^-$ when applying the H level signal to the signal line $D^+$, and vice versa. Thus, the input/output portion 23 of the host computer 13 receives the data from the device 11, and a CPU of the host computer 13 not shown in FIG. 1 analyzes the contents of the data.

Reversely, when the host computer 13 transmits data to the device 11, the input/output portion 23 of the host computer 13 applies a differential signal between the signal lines $D^-$ and $D^+$. Then, the CPU 14 of the device 11 receives data from the host computer 13 via a bus, and analyzes the contents of the data.

When the device 11 connected with the host computer 13 starts its operation, the CPU 14 stores the L level signal to the register 19. This brings the gate 22 into conduction, thereby connecting the pullup resistor 21 with the pullup power supply 20. Thus, the potential $V_M$ of the signal line $D^-$ is pulled up.

Figure 2A:
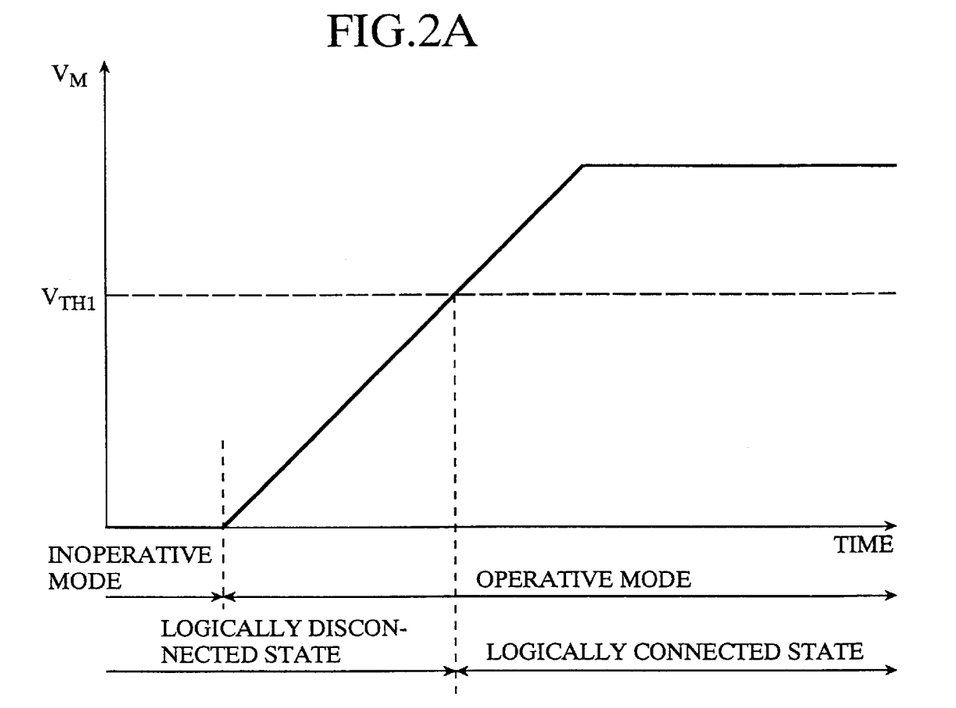
FIGS. 2A and 2B are diagrams illustrating variations of the potential $V_M$ on a signal line $D^-$ in the system of FIG. 1.
Figure 2B:
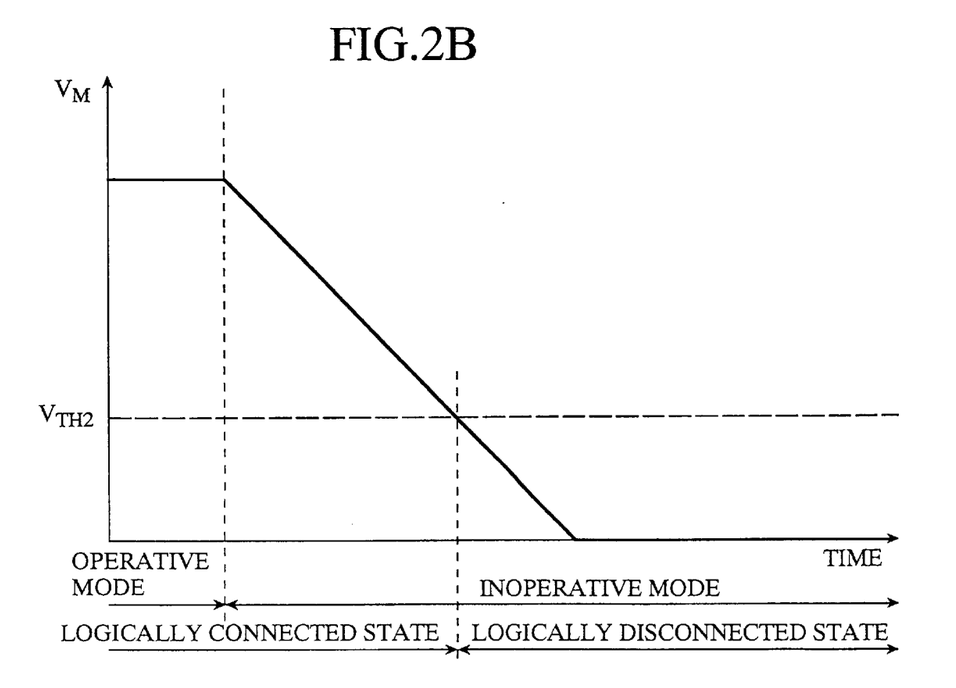

As a result, the potential $V_M$ of the signal line $D^-$ exceeds the set value $V_{TH1}$ as shown in FIG. 2A, if the H level signal is stored in the register 15. The host computer 13 detects this state, and makes a decision that the device 11 is operative now.

However, the host computer 13 cannot always detect the operative mode of the device 11 by checking the potential $V_M$ of the signal line $D^-$. This is because depending on the data to be transmitted from the device 11 to the host computer 13, the L level signal is set in the register 15, in which case the potential $V_M$ on the signal line $D^-$ does not exceed the set value $V_{TH1}$.

In the communication scheme according to the USB standard, however, since the differential signal is applied between the signal lines $D^-$ and $D^+$, when the register 15 stores the L level signal, the register 17 will store the H level signal barring exceptions. This will bring the potential $V_N$ of the signal line $D^+$ above a set value $V_{TH3}$ not shown in the drawings. The exceptions include a case of completing a packet transmission, in which the L level signal is stored in both the registers 15 and 17.

Accordingly, the host computer 13 can make a correct decision that the device 11 is operative by checking the potential $V_N$ on the signal line D⁺ even when transmitting such data.

In summary, the host computer 13 decides that the device 11 is operative if one of the potential $V_M$ on the signal line D⁻ and potential $V_N$ on the signal line D⁺ is higher than the corresponding set values.

On the other hand, when the device 11 is physically connected to the host computer 13, but is actually inoperative, the CPU 14 stores the H level signal into the register 19. This brings the gate 22 into nonconducting state, thereby disconnecting the pullup resistor 21 from the pullup power supply 20. Thus, the potential $V_M$ of the signal line D⁻ is not pulled up.

In addition, when the device 11 is inoperative, since no data is input to the device 11, the registers 15 and 17 are kept in the initial state equivalent to the state in which the L level signal is stored. Thus, the potential $V_M$ of the signal line D⁻ and the potential $V_N$ of the signal line D⁺ become zero, which is lower than set values $V_{TH2}$ and $V_{TH4}$ not shown in the drawings.

As a result, the host computer 13 can make a decision that the device 11 is inoperative by detecting these states.

Incidentally, when completing the packet transmission, since the L level signal is stored in both the registers 15 and 17, the potential $V_M$ of the signal line D⁻ and the potential $V_N$ of the signal line D⁺ also become zero. However, since the duration of the L level signal is short of about 1.3 microseconds, and the mode of the device 11 is decided on the basis of an uninterrupted zero volt for more than 2.5 microseconds according to the USB standard, there is no danger of making an incorrect decision that the device 11 is operative based on the signal indicating the completion of the packet transmission.

According to the present embodiment 1, the pullup resistor 21 is connected to the pullup power supply 20 when the CPU 14 sets the device 11 operative, and disconnected from it when the CPU 14 sets the device 11 inoperative. This enables the device 11 to transfer to the host computer 13 the information on whether the device 11 is operative or inoperative under the condition that they are physically interconnected. As a result, when the device 11 is inoperative, the host computer 13 need not carry out the communication processing with the device 11, which presents an advantage of reducing the processing load of the host computer 13.

Furthermore, since the gate 22 cuts off the current that flows from the pullup power supply 20 to the ground through the pullup resistor 21 and pulldown resistor 24 when the device 11 is inoperative, an advantage of reducing the consumed current can be gained.

Embodiment 2

Figure 3:
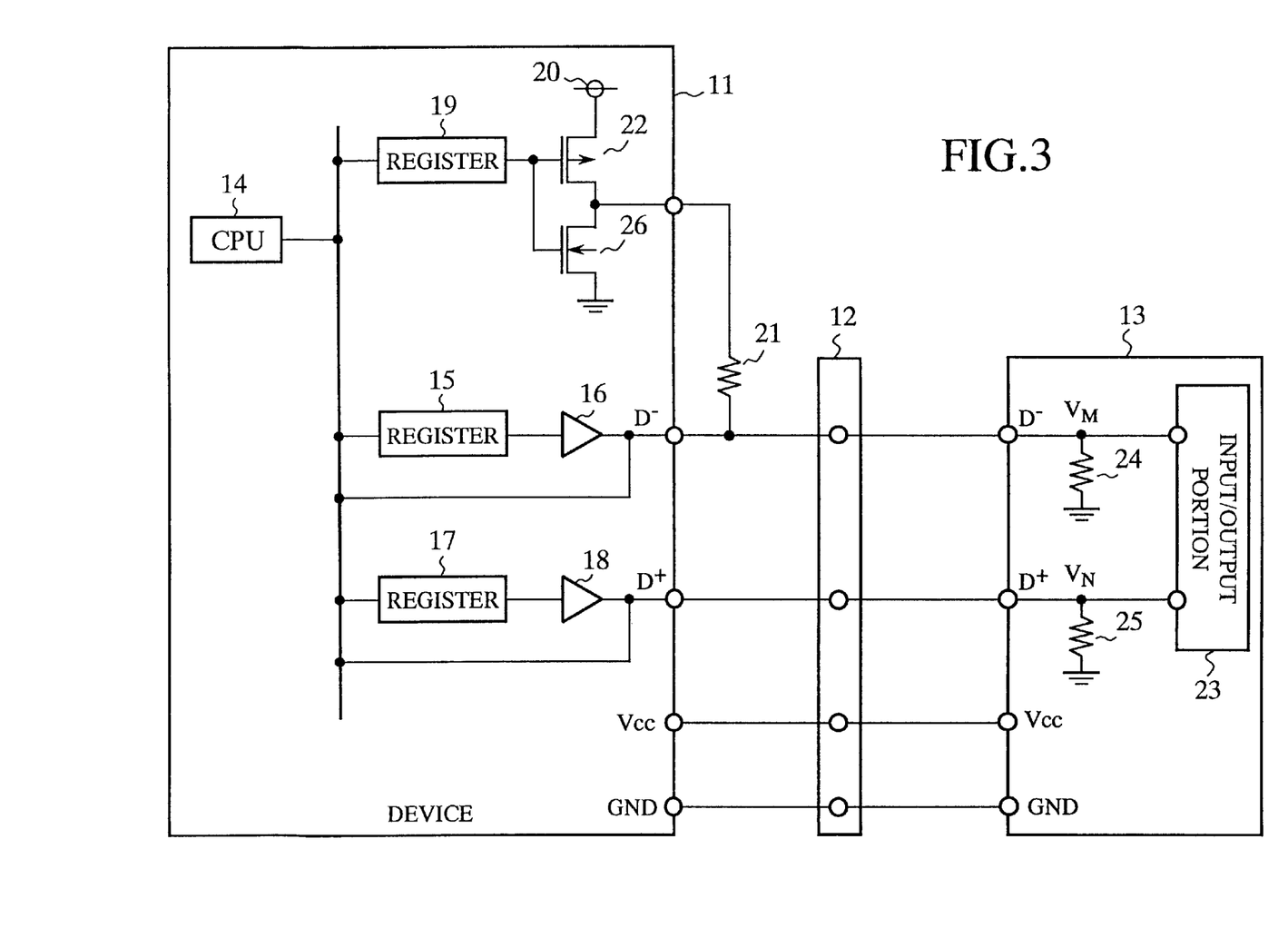
FIG. 3 is a circuit diagram showing an embodiment 2 of the operation mode transfer system in accordance with the present invention.

FIG. 3 is a block diagram showing an embodiment 2 of the operation mode transfer system in accordance with the present invention, in which corresponding portions to those of FIG. 1 are designated by the same reference numerals and the description thereof is omitted here.

In FIG. 3, the reference numeral 26 designates a gate (second switching circuit) consisting of an N-channel MOS transistor having its first end connected to the second end of the pullup resistor 21 and its second end connected to the ground. The gate 26 is brought into a nonconducting state when the L level signal is stored in the register 19, and into a conducting state when the H level signal is stored thereinto.

Next, the operation of the present embodiment 2 will be described.

Since the operation other than the gate 26 is the same as that of the embodiment 1, only the operation associated with the gate 26 will be described.

Since the L level signal is stored in the register 19 when the device 11 is actually operative, the gate 26 is brought into the nonconducting state, and the potential $V_M$ of the signal line D⁻ is pulled up, thereby exceeding the set value $V_{TH1}$ as in the embodiment 1.

On the other hand, since the H level signal is stored in the register 19 when the device 11 is inoperative, the gate 26 conducts, and the pullup resistor 21 is connected to the ground.

Thus, the present embodiment 2 forcefully places the potential $V_M$ of the signal line D⁻ to zero volt, which differs from the embodiment 1 that simply disconnects the pullup resistor 21 from the pullup power supply 20. This offers an advantage that the host computer 13 can identify the inoperative mode of the device 11 earlier than in the embodiment 1, in which the potential $V_M$ of the signal line D⁻ gradually reduces toward zero volt.

Embodiment 3

Figure 4:
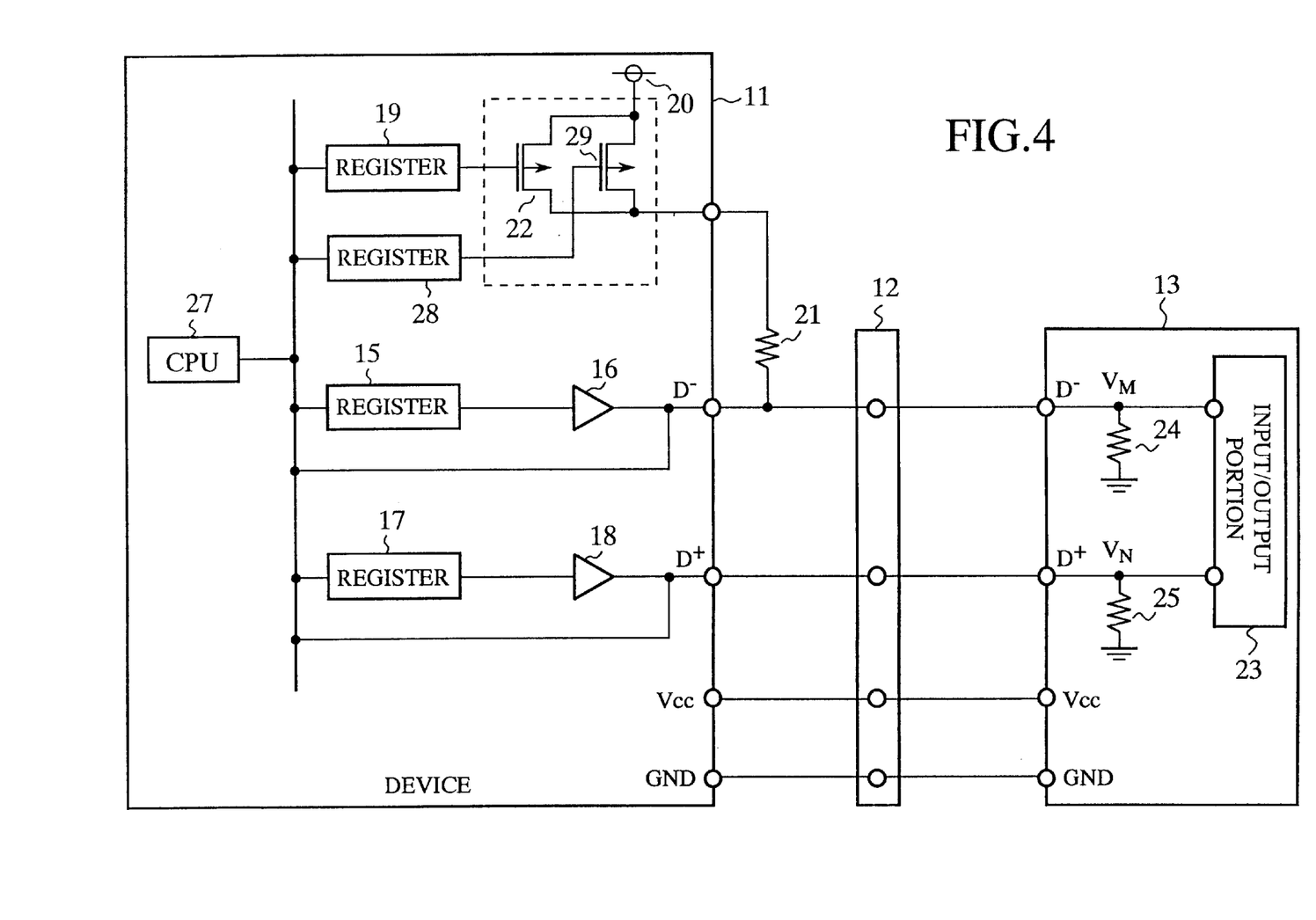
FIG. 4 is a circuit diagram showing an embodiment 3 of the operation mode transfer system in accordance with the present invention.

FIG. 4 is a block diagram showing an embodiment 3 of the operation mode transfer system in accordance with the present invention, in which corresponding portions to those of FIG. 1 are designated by the same reference numerals and the description thereof is omitted here.

Figure 5:
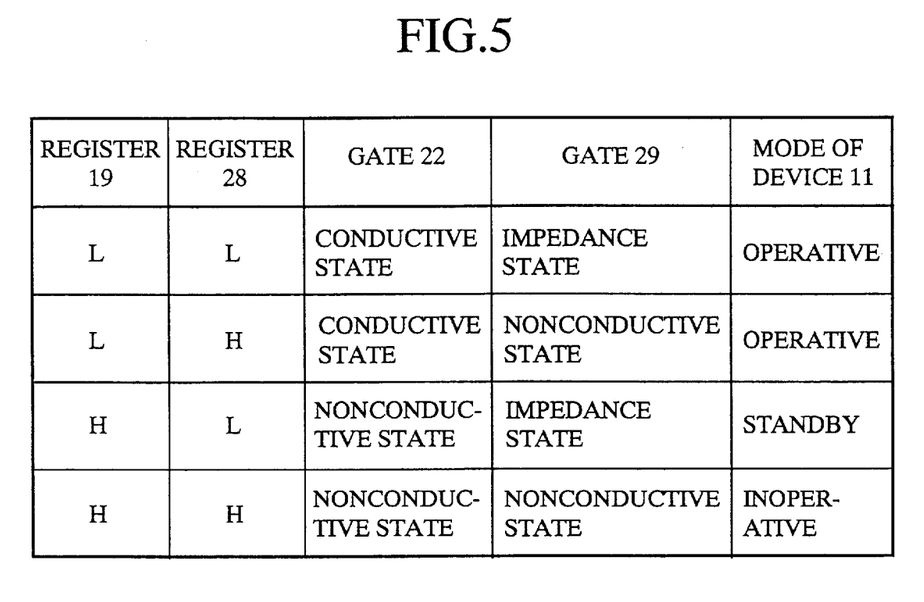
FIG. 5 is a table illustrating states of a device in the embodiment 3 of the operation mode transfer system in accordance with the present invention.

The reference numeral 27 designates a CPU (setting means) for storing the L level signal in the register 19 and the H level signal (or the L level signal) in a register 28 when the device 11 is placed in the operative mode, for storing the H level signal in the registers 19 and 28 when the device 11 is placed in the inoperative mode, and for storing the H level signal in the register 19 and the L level signal in the register 28 when the device 11 is placed in a standby mode as shown in FIG. 5. The reference numeral 28 designates the register (setting means) for storing the signal the CPU 27 outputs; and 29 designates a gate consisting of a P-channel MOS transistor or the like. The gate 29 brings about a state equivalent to that in which a high impedance is connected between the pullup power supply 20 and pullup resistor 21, when the L level signal is stored in the register 28. The gate 29 together with the gate 22 constitute a switching circuit.

Next, the operation of the present embodiment 3 will be described.

As described above, when the inoperative mode is set in the embodiments 1 and 2, the potential $V_M$ of the signal line D⁻ becomes zero volt. Thus, it takes a certain amount of time for the potential $V_M$ of the signal line D⁻ to exceed the set value $V_{TH1}$ to set the device 11 to the operative mode in the next stage.

In view of this, the present embodiment 3 introduces a standby mode (idling mode) which enables the device 11 to be started immediately when it is not operative at present but will be made operative before long. This is implemented by setting the potential $V_M$ of the signal line D⁻ at a potential slightly lower than the set value $V_{TH1}$ instead of dropping it to zero volt.

As shown in FIG. 5, the device 11 can be set in the operative, inoperative or standby mode by changing the combination of the signal levels stored in the registers 19 and 28.

More specifically, to make the device 11 operative, the CPU 27 stores the L level signal in the register 19 and the H level signal (or the L level signal) in the register 28, so that the gate 22 conducts and connects the pullup resistor 21 with the pullup power supply 20 regardless of the state of the gate 29, thereby bringing about the operative mode of the device 11.

On the other hand, to make the device 11 inoperative, the CPU 27 stores the H level signal in the registers 19 and 28, so that the gates 22 and 29, being brought into the nonconductive state, disconnect the pullup resistor 21 from the pullup power supply 20, thereby bringing about the inoperative mode of the device 11.

Finally, to make the device 11 standby, the CPU 27 stores the H level signal in the register 19 and the L level signal in the register 28, so that the gate 22 is brought into the nonconductive state and the gate 29 is placed at the high impedance state which is considered to be equivalent to the state in which a high impedance is connected between the pullup power supply 20 and pullup resistor 21, thereby resulting in the standby mode.

According to the USB standard, the gate 29 with an ON resistance of 150 kilohm is used because the voltage of the pullup power supply 20 is set at 3.3 volts, the value of the pullup resistor 21 is 1.5 kilohm, that of the pulldown resistor 24 is 15 kilohm, the maximum value of the potential $V_M$ of the L level signal output from the buffer 16 is set at 0.3 volt, and the maximum value of the set value $V_{TH1}$ is determined at 0.8 volt.

According to the present embodiment 3, when the CPU 27 carries out the setting to place the device 11 at the standby mode, the impedance is added between the pullup power supply 20 and pullup resistor 21. This offers an advantage that the device 11 can start its operative mode faster while restricting the consumed current to a small amount in the inoperative mode of the device 11, in which case it is unavoidable that a small amount of current flows because the pullup power supply 20 is connected with the pullup resistor 21 through the gate 29 with a high impedance.

Embodiment 4

Although the foregoing embodiment 1 sets the operative or inoperative mode of the device 11 by switching the gate 22, these modes can also be implemented by designing a program of the CPU 14 such that it stores the L level or H level signal in the registers 15 and 17. This enables the L level signal or the H level signal to be applied to the signal line D⁻ (a first signal line) and the signal line D⁺ (a second signal line), which in turn enables the information on whether the device 11 is operative or inoperative to be transferred to the host computer 13 while the device 11 is physically connected with the host computer 13. As a result, it becomes unnecessary for the host computer 13 to carry out the communication processing with the device 11 when it is inoperative, and this offers an advantage of reducing the processing load of the host computer 13.

Embodiment 5

Although the CPU 14 or 27 sets the register 19 and the like in the foregoing embodiments 1–4, this is not essential. For example, instead of the CPUs, external switches can be used for setting the register 19 and the like.

Embodiment 6

Although the pullup resistor 21, gate 22 and the like are connected to the signal line D⁻ to control its potential $V_M$ in the foregoing embodiments 1–4, they can be connected to the signal line Do to control its potential $V_N$.

Embodiment 7

Figure 6:
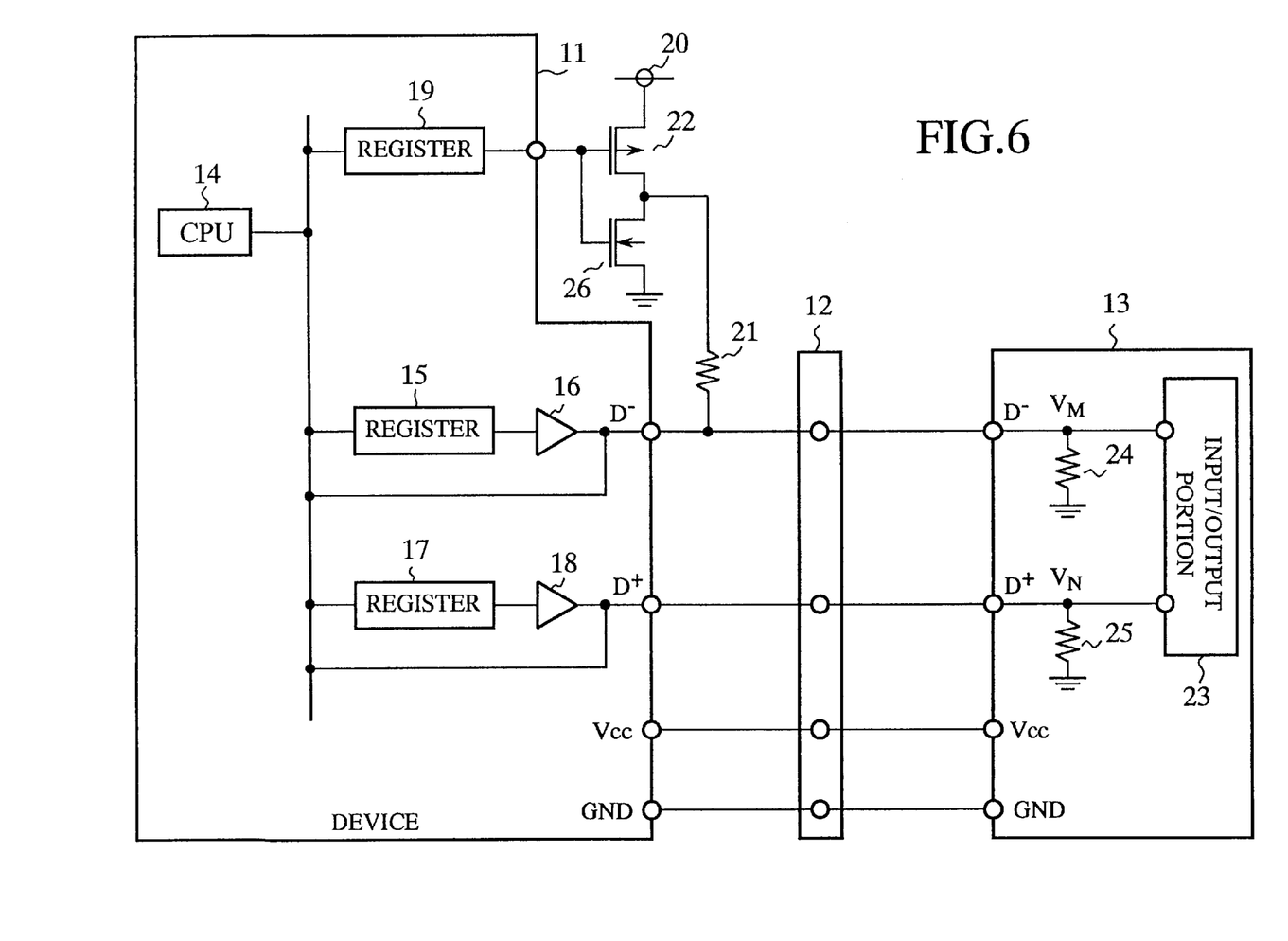
FIG. 6 is a circuit diagram showing an embodiment 7 of the operation mode transfer system in accordance with the present invention.

Although the pullup power supply 20, gate 22 or the like are provided in the device 11 in the foregoing embodiments 1–4, they may be provided outside the device 11 as shown in FIG. 6.

Embodiment 8

Figure 7:
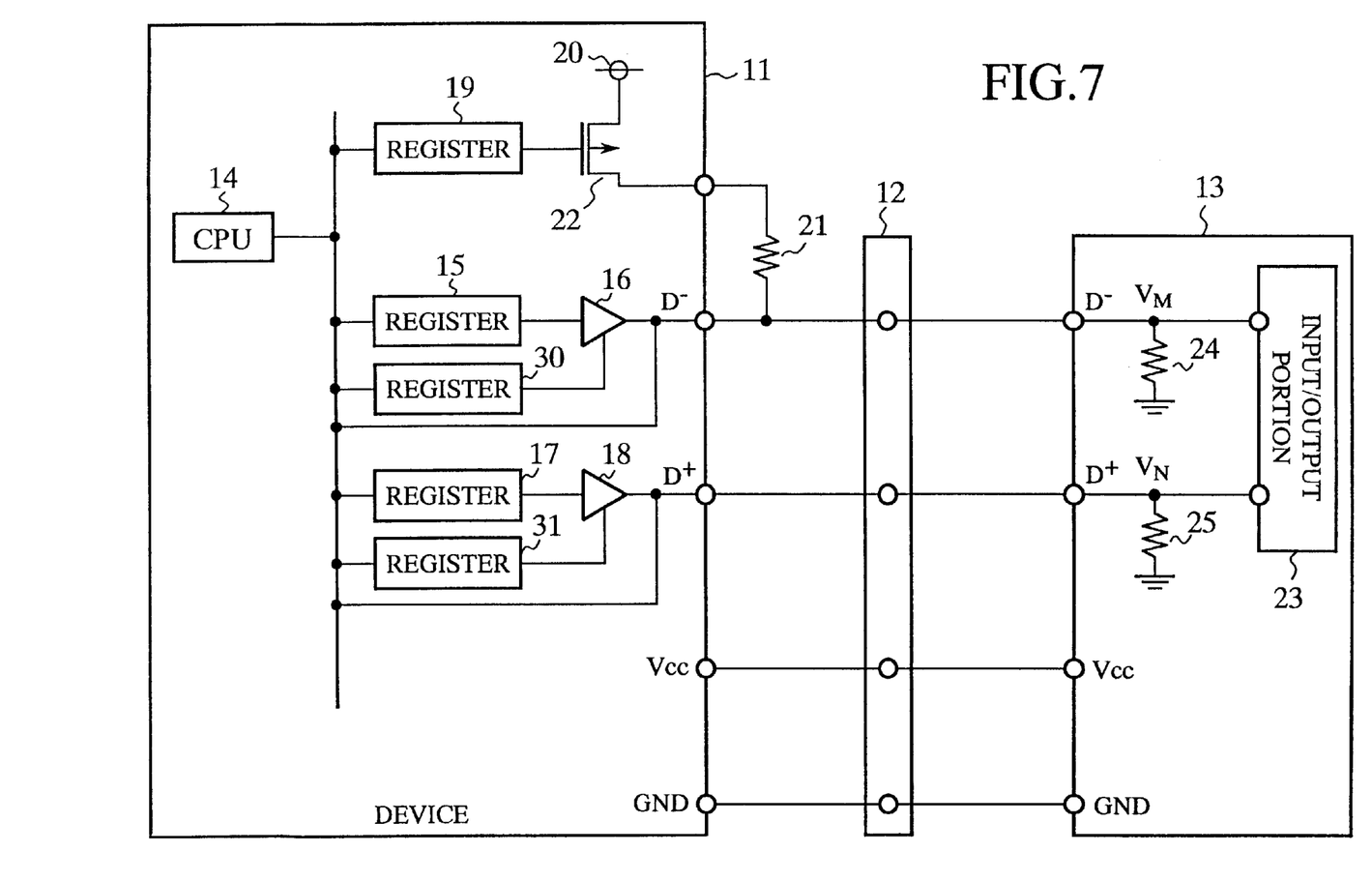
FIG. 7 is a circuit diagram showing an embodiment 8 of the operation mode transfer system in accordance with the present invention.

FIG. 7 is a circuit diagram showing an embodiment 8 of the operation mode transfer system in accordance with the present invention. In FIG. 7, the reference numerals 30 and 31 each designate a register whose content is set by the CPU 14. The registers 30 and 31 place the tri-state buffers 16 and 18 at the off mode, that is, at a high-impedance state when the L level signal is set therein as shown in FIG. 8.

Figure 8:
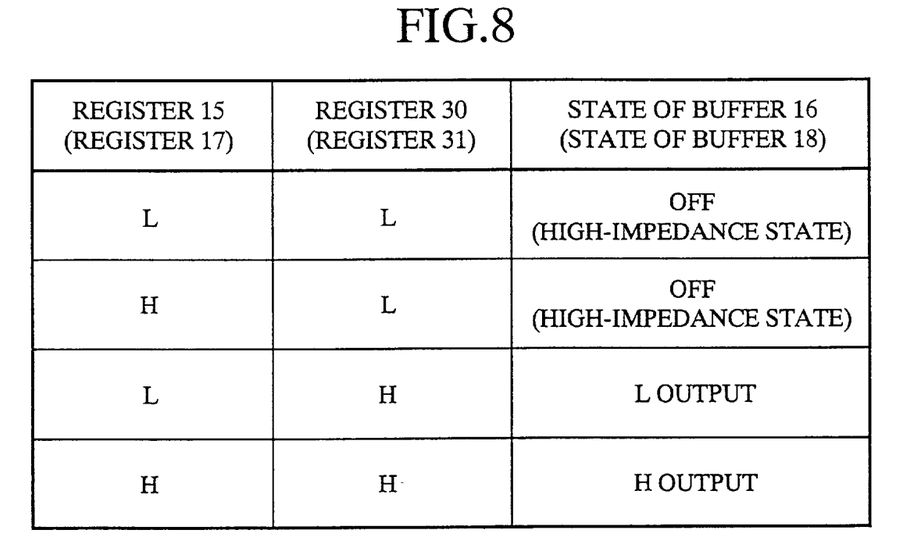
FIG. 8 is a table illustrating states of a buffer in the embodiment 8 of the operation mode transfer system in accordance with the present invention.

To switch the device 11 into the inoperative mode, the CPU 14 sets the L level signal in the registers 30 and 31 so that the buffers 16 and 18 are placed at the high-impedance states as shown in FIG. 8.

This will prevent a current that flows to the ground through the buffer 16 or 18 even when the device 11 is inoperative in the foregoing embodiments, thereby further reducing the consumed current.

Although the data on the signal lines D⁻ and D⁺ is directly supplied to the bus in the foregoing embodiments 1–8, a latch circuit may be provided to hold the input data to the bus as needed.

What is claimed is:

1. An operation mode transfer system comprising:
   setting means for setting an operative mode and an inoperative mode of a device;
   a pullup resistor according to a USB (Universal Serial Bus) standard with its first end connected to a signal line according to the USB standard; and
   a first switching circuit with its first end connected to a power supply, and its second end connected to a second end of said pullup resistor,
   wherein said first switching circuit is brought into conduction when said setting means sets the operative mode of the device, and is brought out of conduction when said setting means sets the inoperative mode of the device.

2. The operation mode transfer system as claimed in claim 1, further comprising a second switching circuit with its first end connected to the second end of said pullup resistor, and its second end connected to a ground, wherein said second switching circuit is brought out of conduction when said setting means sets the operative mode of the device, and is brought into conduction when said setting means sets the inoperative mode of the device.

3. The operation mode transfer system as claimed in claim 1, further comprising a tri-state buffer connected to said signal line, and a register connected to said tri-state buffer, wherein said setting means sets said tri-state buffer in a high-impedance state through said register when it sets the inoperative mode of said device.

4. An operation mode transfer system comprising:
   setting means for setting an operative mode, an inoperative mode and a standby mode of a device;
   a pullup resistor according to a USB (Universal Serial Bus) standard with its first end connected to a signal line according to the USB standard; and
   a switching circuit with its first end connected to a power supply, and its second end connected to a second end of said pullup resistor,
   wherein said switching circuit is brought into conduction when said setting means sets the operative mode of the device, is brought out of conduction when said setting means sets the inoperative mode of the device, and is brought into an impedance state when said setting means sets the standby mode of the device.

5. An operation mode transfer method comprising the steps of:

supplying a first signal line and a second signal line with signals of different levels, when setting a device in an operative mode, said first signal line and said second signal line according to USB (Universal Serial Bus) standard; and supplying said first signal line and said second signal line with a signal of a same level when setting the device in an inoperative mode.

\* \* \* \* \*